(12) United States Patent  
Mitsutake et al.

(10) Patent No.: US 9,083,840 B2
(45) Date of Patent: Jul. 14, 2015

(54) ILLUMINATION DEVICE AND IMAGE READING APPARATUS

(71) Applicant: CANON KABUSHIKI KAISHA, Tokyo (JP)

(72) Inventors: Ikutaro Mitsutake, Utsunomiya (JP); Tadao Hayashide, Utsunomiya (JP); Narumasa Ito, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/197,787

(22) Filed: Mar. 5, 2014

(65) Prior Publication Data
US 2014/0253982 A1 Sep. 11, 2014

(30) Foreign Application Priority Data

Mar. 6, 2013 (JP) ................................. 2013-044283

(51) Int. Cl.
H04N 1/04 (2006.01)
H04N 1/028 (2006.01)
F21V 9/04 (2006.01)
F21V 13/08 (2006.01)
F21V 9/06 (2006.01)
G01J 3/00 (2006.01)

(52) U.S. Cl.
CPC .............. H04N 1/02815 (2013.01); F21V 9/04 (2013.01); F21V 9/06 (2013.01); F21V 13/08 (2013.01); G01J 3/00 (2013.01)

(58) Field of Classification Search
CPC .................... H04N 1/02815; H04N 2209/043; H04N 2209/044; H04N 5/2252; H04N 5/2256; H04N 5/232; H04N 5/33; H04N 9/045
USPC ............................................ 358/475, 509, 75
See application file for complete search history.

(56) References Cited

U.S. PATENT DOCUMENTS

| 4,807,026 | A | * | 2/1989 | Nishioka et al. | 348/70 |
| 4,882,619 | A | * | 11/1989 | Hasegawa et al. | 348/337 |
| 4,916,534 | A | * | 4/1990 | Takhashi et al. | 348/67 |
| 5,083,252 | A | * | 1/1992 | McGuire | 362/293 |
| 5,177,605 | A | * | 1/1993 | Takahashi et al. | 348/65 |
| 6,293,911 | B1 | * | 9/2001 | Imaizumi et al. | 600/160 |
| 7,075,645 | B2 | * | 7/2006 | Gehrlein et al. | 356/328 |
| 7,179,222 | B2 | * | 2/2007 | Imaizumi et al. | 600/109 |
| 7,554,572 | B2 | * | 6/2009 | Takahashi | 348/65 |
| 7,787,121 | B2 | * | 8/2010 | Tsujita et al. | 356/407 |
| 8,259,167 | B2 | * | 9/2012 | Ishiwata et al. | 348/65 |
| 8,537,210 | B2 | * | 9/2013 | Omori et al. | 348/68 |
| 2005/0264672 | A1 | * | 12/2005 | Takahashi | 348/335 |

FOREIGN PATENT DOCUMENTS

JP 07-087270 A 3/1995
JP 07-115512 A 5/1995

(Continued)

*Primary Examiner* — Negussie Worku
(74) *Attorney, Agent, or Firm* — Rossi, Kimms & McDowell LLP

(57) ABSTRACT

An illumination device and an image reading apparatus having improved heat resistance and spectral characteristics are provided. An illumination device used in an image reading apparatus that moves relative to a read area of a document includes: a light source; a light guide including an incident surface on which light from the light source is incident and an exit surface from which light from the light source exits; and a spectroscopic unit that is provided between the light source and the light guide and includes, on a surface of a glass substrate facing the light source, a multi-layer film for reflecting infrared light toward the light source.

17 Claims, 4 Drawing Sheets

(56) References Cited

FOREIGN PATENT DOCUMENTS

| JP | 08-154151 A | 6/1996 |
| JP | 2001-016413 A | 1/2001 |
| JP | 2003-248274 A | 9/2003 |
| JP | 2006-227384 A | 8/2006 |
| JP | 2008-028617 A | 2/2008 |
| JP | 2012-244381 A | 12/2012 |

* cited by examiner

ILLUMINATION DEVICE AND IMAGE READING APPARATUS

BACKGROUND OF THE INVENTION

1. Field of the Invention

The present invention relates to an illumination device, and is particularly suitable for an image reading apparatus.

2. Description of the Related Art

Conventionally, the following problem arises in an image reading apparatus as in an image pickup apparatus in which a subject image formed by an imaging optical system is obtained by an image pickup unit such as a film or an image sensor (image pickup element). When light of a wavelength other than a visible range, in particular infrared light or ultraviolet light, reaches the image pickup element, the color changes from the original subject image (decrease in color rendering of the obtained image).

Accordingly, as a subject illumination device used in an image reading apparatus, a subject illumination device that removes infrared light by interposing a film for absorbing infrared light between a light source and an incident portion of a main scanning end incident-type light guide is known (Japanese Patent Application Laid-Open No. 2008-028617). Other than the film, a filter for absorbing infrared light is also known as a member for absorbing infrared light.

On the other hand, as a light source, a high-brightness LED (power LED) that emits a large amount of light per element is developed especially in recent years, and its application to an image reading apparatus as a light source with better color rendering than a conventional light emitting diode (hereafter "LED") is under study.

However, when used together with the high-brightness LED (power LED), the film-like filter as in Japanese Patent Application Laid-Open No. 2008-028617 has a problem with the heat resistance of the film material to a large amount of heat generated by the LED.

Especially, an illumination device used in an image reading apparatus for a copying machine or a combination machine that performs high-speed reading is required to have high intensity as a substitute for a conventionally used high-pressure discharge lamp, and so the corresponding LED is required to have high light emission intensity with low power consumption. For example, luminous flux emission of 50 lumens or more per element is required. When used together with the LED having such high light emission intensity, the film-like filter as in Japanese Patent Application Laid-Open No. 2008-028617 has a problem with the heat resistance of the film material.

Besides, the power LED used in this application tends to exceed 120° C. in junction temperature at rated current, and is higher in temperature than the conventional LED though it generates less heat than the high-pressure discharge lamp. Hence, peripheral parts of the LED are also required to be heat-resistant. The film-like filter as in Japanese Patent Application Laid-Open No. 2008-028617 is problematic in this respect, too.

In the case of using an infrared absorbing filter instead of the above-mentioned film-like filter, the following problem arises. Since the spectral transmittance characteristics of the infrared absorbing filter are typically not as steep as those of a dichroic filter made of a multi-layer film, many infrared components are left unabsorbed and more light in the necessary visible range is absorbed. Particularly in the case of using a high color rendering white LED developed in recent years, the ratio of infrared components is higher than that of a conventional white LED, and so there is a risk of decreasing the color rendering of the obtained image.

SUMMARY OF THE INVENTION

The present invention has an object of providing an illumination device and an image reading apparatus having improved heat resistance and spectral characteristics.

To achieve the object stated above, an illumination device according to the present invention includes: a light source; a light guide including an incident surface on which light from the light source is incident; and a spectroscopic unit disposed between the light source and the incident surface, wherein the spectroscopic unit includes: a substrate made of glass; and a multi-layer film that is provided on a surface of the substrate facing the light source and reflects infrared light toward the light source.

An image reading apparatus using the above-mentioned illumination device constitutes another aspect of the present invention.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Image Reading Apparatus

Figure 3:
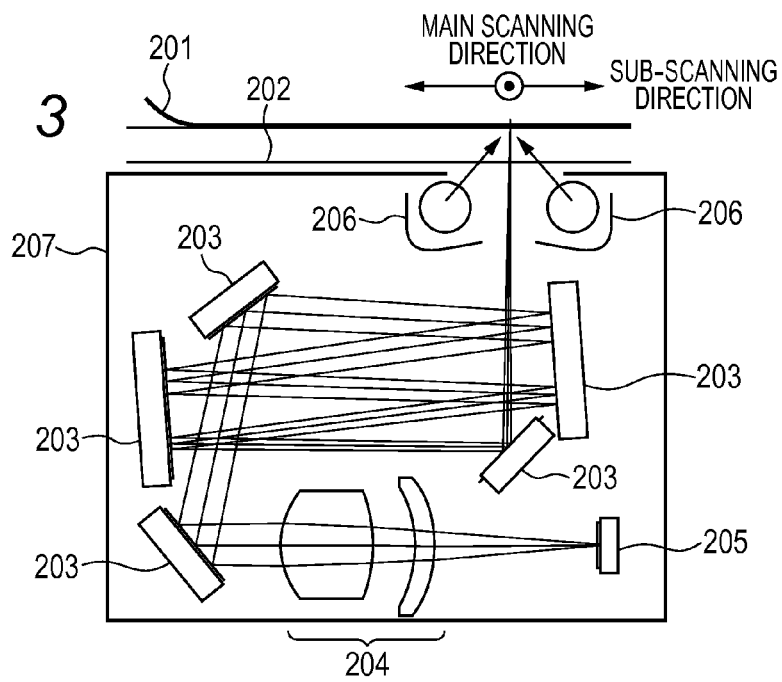
FIG. 3 is a schematic diagram of a relevant part of an image reading apparatus including a subject illumination device.

FIG. 3 is a schematic diagram of a relevant part of a carriage-integrated image reading apparatus (flatbed scanner). A document table glass 202 has a document 201 placed on its surface. A carriage 207 holds an illumination device 206 described later, a plurality of reflection mirrors 203, an imaging optical system (imaging lens) 204 for forming an image of a read area of the document, a CMOS linear sensor 205 which is an image pickup element for photoelectrically converting the image formed by the imaging optical system, and the like.

The fixed document is scanned by moving the carriage 207 in a sub-scanning direction illustrated in the drawing by a motor (not illustrated) or the like, to two-dimensionally read image information in the read area (long area in a main scanning direction illustrated in the drawing) of the document 201. Alternatively, the document 201 to be read may be conveyed in the sub-scanning direction in a state where the carriage 207 is fixed in the sub-scanning direction, to sequentially read lines.

Thus, the image reading apparatus in which the imaging optical system and the image pickup element provided in the main scanning direction on the imaging surface are moved in the sub-scanning direction relative to the read area of the document has the document fixing type and the document moving type, and the present invention is applicable to both types.

The CMOS linear sensor 205 which is the image pickup element includes three line sensors. The image information of the document 201 is imaged by the imaging optical system 204 at a predetermined magnification factor. The three line sensors are respectively provided with color filters of three colors red (R), green (G), and blue (B), and read red, green, and blue components of the image information. Analog signals (analog information) from the line sensors then pass through an operational amplifier (not illustrated), and are converted to digital signals (digital information) by an A/D converter. The read image information is transmitted to an external apparatus such as a personal computer via an interface (not illustrated).

(Illumination Device)

The illumination device 206 used in the image reading apparatus illuminates the long area in the paper depth direction in FIG. 3 on the surface of the document table glass 202, that is, the substantially linear read area long in the main scanning direction.

Figure 2:
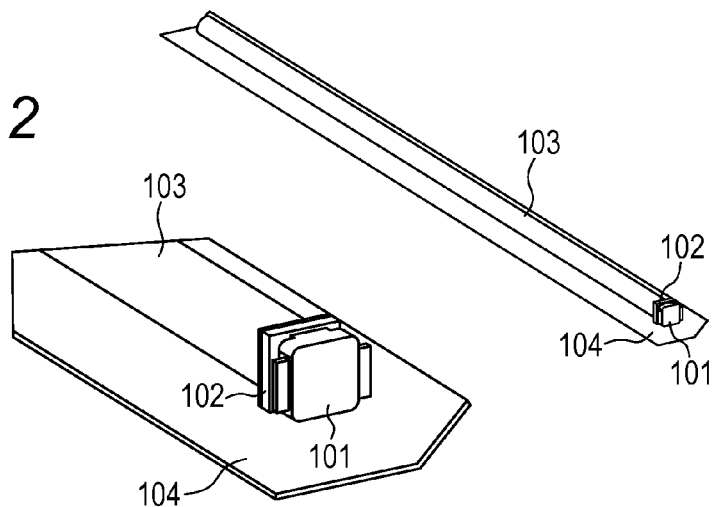
FIG. 2 is an overall schematic diagram of a subject illumination device according to Embodiment 1 of the present invention.

In FIG. 2, the illumination device includes a white LED (light emitting diode) 101 which is a light source, a spectral characteristic adjustment unit (spectroscopic unit) 102 described in detail later, and a light guide member (light guide) 103. The spectroscopic unit 102 is provided on the light source side, separately from the light guide 103. A carriage portion 104 is a portion of the carriage. A light source substrate and a member for holding each part (not illustrated) are also included.

Light emitted from the white LED 101 first passes through the spectroscopic unit 102, and enters the light guide 103. Here, the spectroscopic unit 102 blocks infrared light, in order to prevent unwanted infrared light from being received by the red (R) line sensor of the three line sensors in the CMOS linear sensor 205 and causing a change in color. This will be described in detail later.

Figure 4:
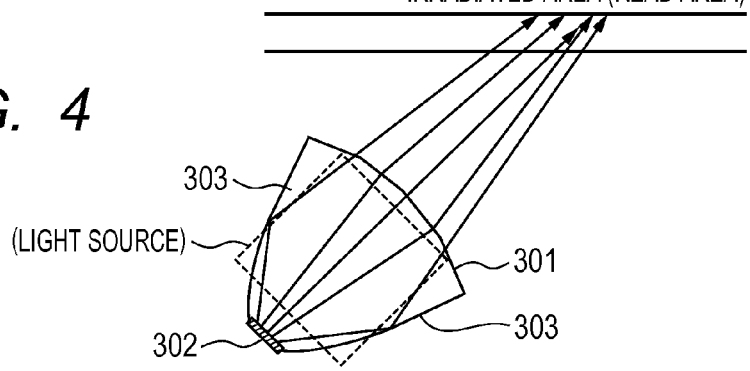
FIG. 4 is a sectional diagram of a light guide in a subject illumination device.

As illustrated in FIG. 2, light incident on an incident surface which is one end surface of the light guide 103 in the longitudinal direction (main scanning direction) propagates in the main scanning direction, while being partially diffused by a diffusion surface (a lower surface 302 of the light guide 103 in the longitudinal direction illustrated in FIG. 4) included in the light guide 103. Of the light diffused by the diffusion surface, components with small incident angles that do not satisfy a condition of total reflection by a total reflection side surface inside the light guide 103 exit from an exit surface (an upper surface 301 of the light guide 103 in the longitudinal direction illustrated in FIG. 4) of the light guide 103.

In this embodiment, the shape of the light guide 103 and the characteristics of the diffusion surface are adjusted so that more light travels to the read area and also the light amount distribution in the main scanning direction is a desired distribution. That is, in this embodiment, the exit surface 301 facing an irradiated portion which is the read area of the document is shaped as a cylinder surface extending in the main scanning direction, the lower surface 302 which is the diffusion surface opposite to the exit surface 301 is shaped as a flat surface, and a side surface 303 connecting the exit surface 301 and the lower surface 302 is shaped as a paraboloid extending in the main scanning direction. This enables the light diffused by the diffusion surface to be efficiently guided to the irradiated surface, as a result of which favorable illumination is achieved.

(High Color Rendering White Power LED)

In this embodiment, the white LED (white light emitting diode) 101 which is the light source is commonly known as a white power LED using a fluorescent agent, and is also a high color rendering LED with enhanced color rendering among power LEDs. Color rendering is one index representing performance of an artificial light source, and indicates a capability of expressing objects with colors similar to those in a state where the objects are seen in natural light. Such a light source in this embodiment has one or more light emission points inside, irradiates the fluorescent material with blue light generated from the light emission points, and emits white light together with a wavelength intensity distribution generated by fluorescence.

Figure 5:
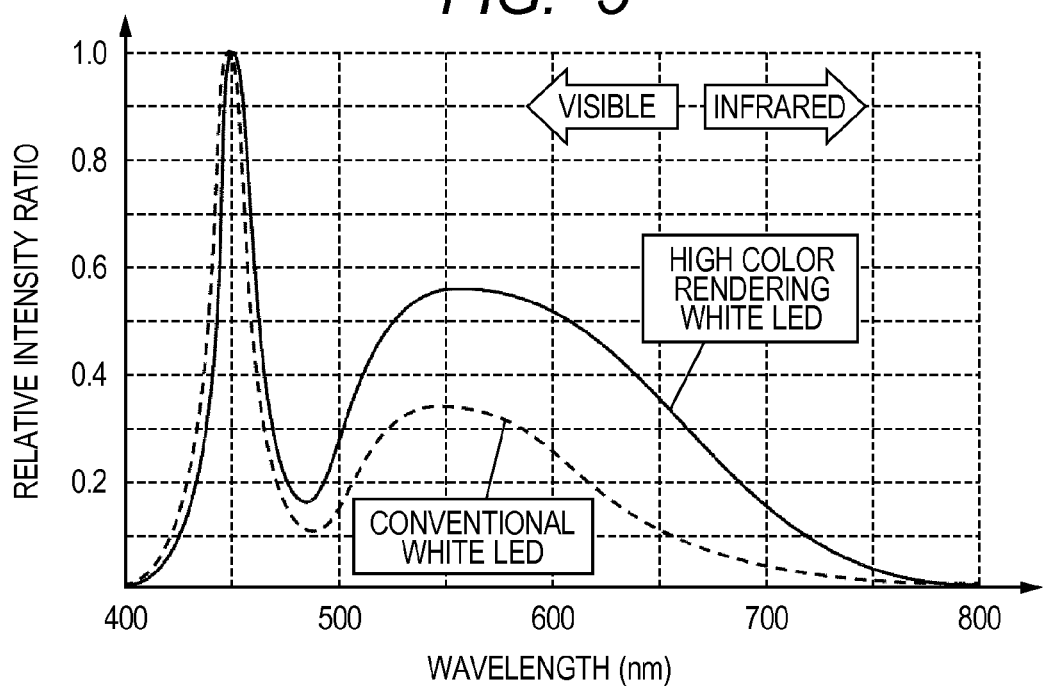
FIG. 5 is a diagram illustrating spectral characteristics of a white light emitting diode as a light source.

The high color rendering white power LED in this embodiment has the same principle as the conventional white power LED. As illustrated in FIG. 5, however, the high color rendering white power LED generates many components especially longer than about 500 nm in wavelength, due to the differences in use amount and characteristics of the fluorescent material. This causes an increase of unwanted infrared light in the image reading apparatus. In detail, the relative intensity ratio at the wavelength of 700 nm is about 5% in the typical white LED, but exceeds 10% in the high color rendering LED in this embodiment.

(Spectroscopic Unit)

Figure 1A:
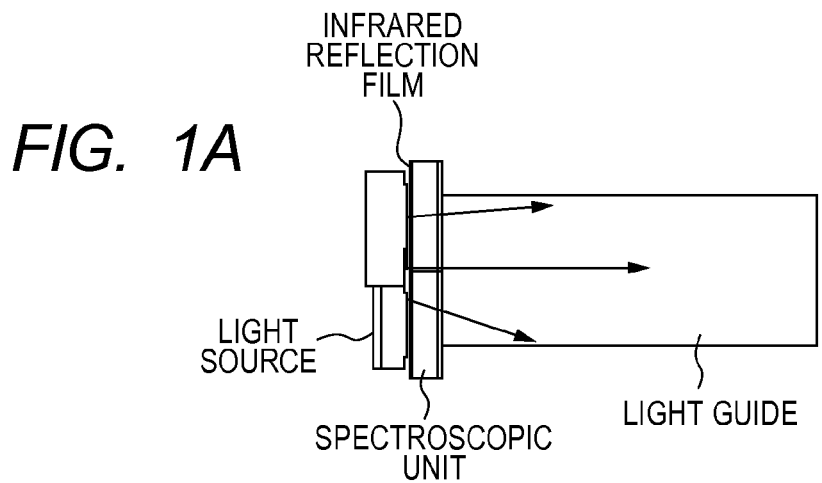
FIG. 1A is a diagram illustrating whether or not an infrared reflection film as a multi-layer film is appropriately arranged in a subject illumination device according to an embodiment of the present invention.

As illustrated in FIG. 1A, the spectroscopic unit 102 in this embodiment includes a flat glass of 1 mm in thickness as a substrate having favorable heat resistance, and a multi-layer film for reflecting at least infrared light toward the LED (light source) is provided on the surface of the glass substrate facing the LED (light source). Accordingly, at least infrared components of light emitted from the LED are cut off by the spectroscopic unit 102. A change in color reproducibility of the obtained image by diffused reflected light in the case where infrared components reach the irradiated portion is thus prevented or suppressed.

When providing the spectroscopic unit 102 with the infrared reflection function so as not to transmit unwanted infrared light, there is a need to keep the spectroscopic unit from blocking the transmission of necessary visible light with a large incident angle. As illustrated in FIG. 1C, in the spectroscopic unit in this embodiment, there is a tendency that the spectral characteristics (spectral transmittance characteristics) shift toward shorter wavelengths as the incident angle increases, so that necessary visible light with a large incident angle is not transmitted. This causes a decrease in illumination light amount.

In detail, as illustrated in FIG. 1C, in the spectroscopic unit in this embodiment, the transmittance is half (half is reflected) at the wavelength of about 675 nm when the incident angle is 0°. When the incident angle is 23°, on the other hand, the transmittance is half at the wavelength of 640 nm, and visible light of 675 nm in wavelength is hardly transmitted.

In view of this, in this embodiment, necessary visible light with a large incident angle (a first incident angle) is once returned to the light source, and then is made incident from the light source on the spectroscopic unit again as visible light with a small incident angle (a second incident angle smaller than the first incident angle). In other words, the characteristic curve in the case where the incident angle is large (the incident angle is 23°) is brought closer to the characteristic curve in the case where the incident angle is small (the incident angle is 0°) in FIG. 1C.

In detail, the structure illustrated in FIG. 1A is employed so that necessary visible light with a large incident angle is returned to the light source as much as possible. Incident angle conversion for incident light is then performed using light with a small incident angle among scattered light through diffused reflection by an LED package or a light exit portion, to make light with a small incident angle incident on the spectroscopic unit again and transmitted.

Figure 1B:
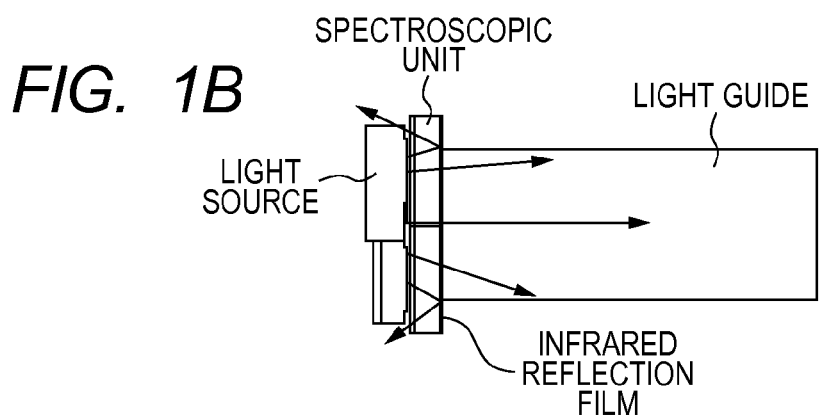
FIG. 1B is a diagram illustrating whether or not an infrared reflection film as a multi-layer film is appropriately arranged in a subject illumination device according to an embodiment of the present invention.
Figure 1C:
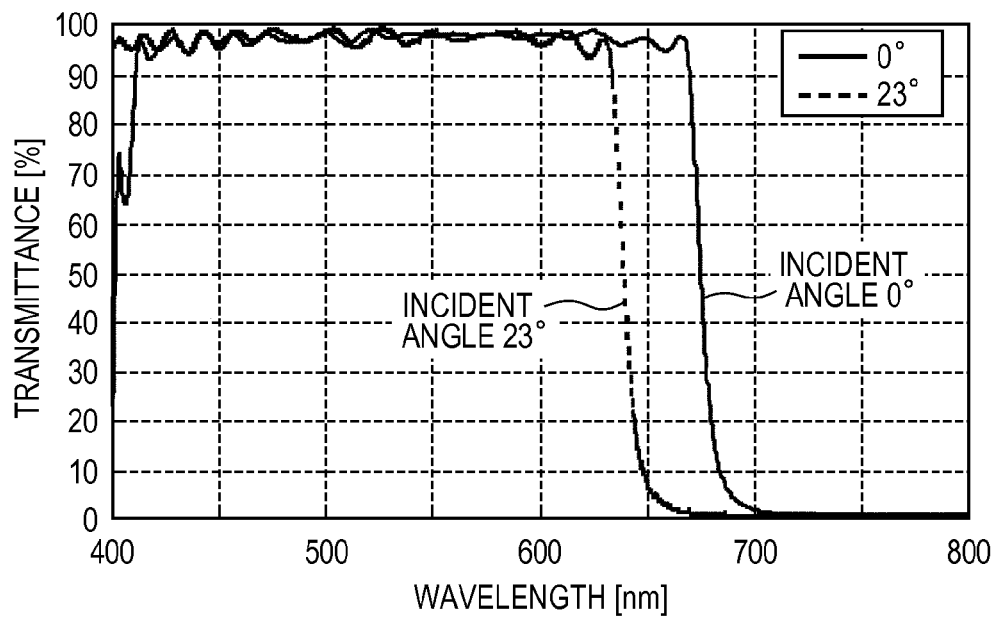
FIG. 1C is a diagram illustrating spectral characteristics of a dichroic filter made of a multi-layer film corresponding to different incident angles.

A structure illustrated in FIG. 1B has the following problem, when compared with the structure illustrated in FIG. 1A. Though reflected light returns to the LED (light source) side, since the distance from the multi-layer film (reflection surface) to the LED (light source) is longer than that in the arrangement in FIG. 1A, there is a possibility of a decrease in illumination efficiency as more components are absorbed and lost halfway or travel to a range where the LED (light source) is not present.

In this embodiment, unwanted infrared light can be prevented from being transmitted relatively at low cost by employing the structure illustrated in FIG. 1A, as compared with the case of employing a method of increasing the number of layers of the multi-layer film, i.e. a method that involves more steps and so requires higher cost.

Figure 6A:
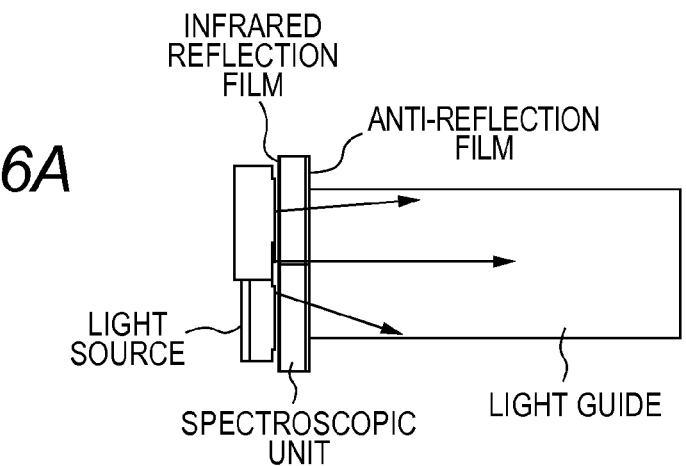
FIG. 6A is a diagram illustrating that a spectroscopic unit is separated from a light guide in the subject illumination device according to Embodiment 1.
Figure 6B:
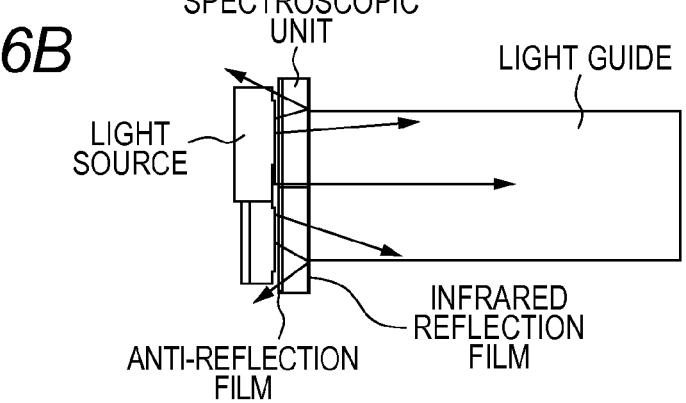
FIG. 6B is a diagram illustrating a subject illumination device as a comparative example.

In addition to the structure illustrated in FIG. 1A, in this embodiment, an anti-reflection film for visible light is provided on the opposite surface (the surface facing the light guide 103) of the above-mentioned substrate as illustrated in FIG. 6A, to suppress a decrease in illumination efficiency. FIG. 6B illustrates the case where an anti-reflection film for visible light is provided on the opposite surface (the surface facing the light source (LED) 101) of the substrate based on FIG. 1B as a comparative example.

Embodiment 2

Figure 7:
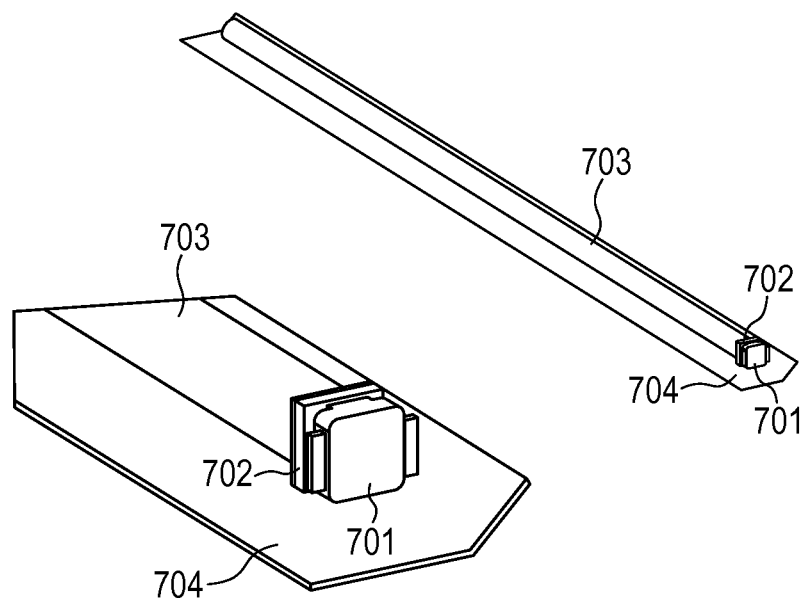
FIG. 7 is an overall schematic diagram of a subject illumination device according to Embodiment 2 of the present invention.
Figure 8:
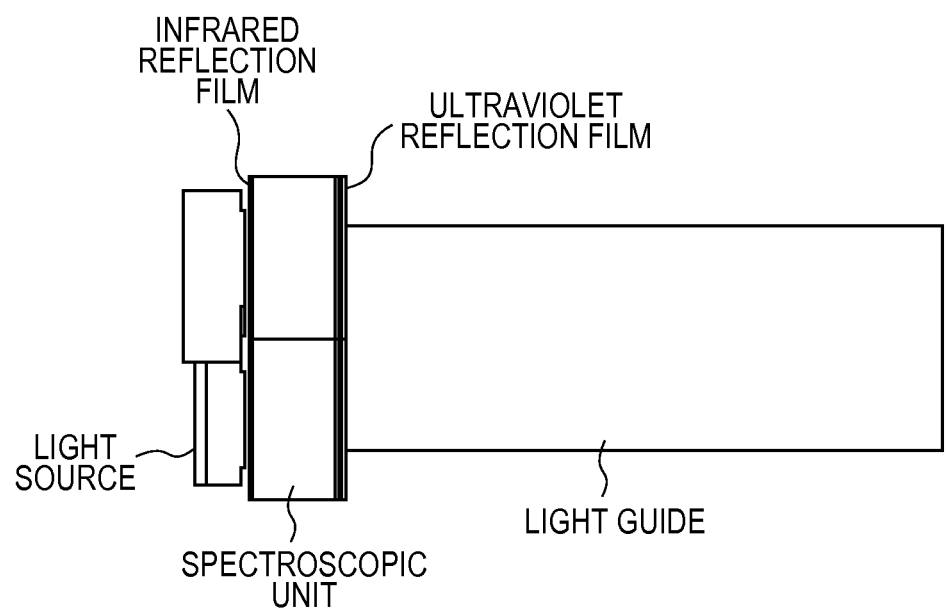
FIG. 8 is a diagram illustrating that a spectroscopic unit is in close contact with or adheres to a light guide in the subject illumination device according to Embodiment 2.

FIGS. 7 and 8 illustrate an illumination device for image reading in this embodiment. In FIG. 7, the illumination device includes a white LED (light emitting diode) 701 which is a light source, a spectroscopic unit 702, and a light guide member (light guide) 703. A carriage portion 704 is a portion of the carriage. A light source substrate and a member for holding each part (not illustrated) are also included. Parts such as the light guide and the carriage are the same as those in Embodiment 1, and so their detailed description is omitted.

In FIG. 8, the spectroscopic unit 702 in this embodiment includes a flat glass of 2 mm in thickness as a substrate having favorable heat resistance, and an infrared reflection film made of a multi-layer film for reflecting infrared light is provided on the surface of the glass substrate facing the LED (light source). In addition, an ultraviolet reflection film made of a multi-layer film for reflecting ultraviolet light is provided on the opposite surface (the surface facing the light guide 703) of the substrate. The opposite surface (the surface facing the light guide 703) of the substrate is in close contact with the light guide 703 or adheres to the light guide 703 by an adhesive.

In this embodiment, the infrared reflection film for reflecting infrared light is provided on the surface of the substrate facing the LED (light source), to achieve the same advantageous effects as in Embodiment 1. That is, unwanted infrared light is suppressed, and the decrease in illumination efficiency can be prevented by reducing the incident angle of visible light in the necessary wavelength region, which is reflected due to its large incident angle, and making the visible light incident again.

Moreover, in this embodiment, the ultraviolet reflection film for reflecting ultraviolet light is provided on the surface of the substrate facing the light guide, to reflect unwanted ultraviolet light and thus prevent or suppress transmission of unwanted ultraviolet light to the light guide. Regarding the ultraviolet reflection film, too, the spectral characteristics (spectral transmittance characteristics) shift toward shorter wavelengths as the incident angle increases, like the infrared reflection film as illustrated in FIG. 1C. Hence, there is a possibility that light shorter than an intended cut wavelength is transmitted. However, the intensity of ultraviolet light is lower than that of infrared light in typical white LEDs, and its influence is insignificant as compared with the case where unwanted infrared light leaks (in the case where the structure of the infrared reflection film is not appropriate).

Furthermore, in this embodiment, the surface that faces the light guide and on which the multi-layer film for cutting off ultraviolet light is provided is in close contact with or adheres to the light guide, so that light amount loss due to internal reflection can be reduced. Besides, by forming the side surfaces facing neither the LED (light source) nor the light guide as gloss surfaces as in Embodiment 1, a decrease in efficiency caused when light internally reflects off these surfaces and leaks from the sides of the spectroscopic unit can be prevented or suppressed.

(Modifications)

Although preferred embodiments of the present invention have been described above, the present invention is not limited to these embodiments, and various modifications and changes are possible within the scope of the present invention. For example, the spectroscopic unit may include both the anti-reflection film for visible light and the ultraviolet reflection film for reflecting ultraviolet light, on the opposite side (the side facing the light guide) of the substrate to the surface facing the light source. In this case, the anti-reflection film and the ultraviolet reflection film may be arranged in this order or in reverse order.

The number of layers of the multi-layer film in the embodiments described above is 3 to 30, and desirably 5 to 20. A larger number of layers contribute to steeper spectral characteristics, but require higher cost.

The light guide member (light guide) is not limited to that in the embodiments described above, and may have an arbitrary structure. For example, with respect to the exit surface 301, the incident surface may be the lower surface 302 instead of the surface 303 in FIG. 4.

The thickness of glass as the substrate is arbitrary, and is not limited to that in the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-044283, filed Mar. 6, 2013, which is hereby incorporated by reference herein in its entirety.

What is claimed is:

1. An illumination device comprising:
   a light source;
   a light guide including an incident surface on which light from the light source is incident; and
   a spectroscopic unit disposed between the light source and the incident surface,
   wherein the spectroscopic unit includes:
      a substrate made of glass; and
      a multi-layer film that is provided on a surface of the substrate facing the light source and reflects infrared light toward the light source.

2. The illumination device according to claim 1, wherein the light source includes a scattering portion for scattering light reflected by the multi-layer film.

3. The illumination device according to claim 2, wherein the scattering portion scatters light that is incident on the multi-layer film at a first incident angle and is reflected by the multi-layer film, and makes at least a part of the scattered light incident on the multi-layer film again at a second incident angle that is smaller than the first incident angle.

4. The illumination device according to claim 3, wherein the multi-layer film reflects visible light incident at the first incident angle, toward the light source.

5. The illumination device according to claim 1, wherein the multi-layer film has spectral characteristics that shift toward shorter wavelengths as incident light increases in incident angle.

6. The illumination device according to claim 3, wherein the light source is a white light emitting diode using a fluorescent agent.

7. The illumination device according to claim 1, wherein the light guide comprises an exit surface from which light from the incident surface exits and which is long in a first direction.

8. The illumination device according to claim 7, wherein the light guide comprises a diffusion surface diffusing light from the incident surface and guiding the light to the exit surface.

9. The illumination device according to claim 7, wherein the incident surface is one end surface of the light guide in the first direction.

10. The illumination device according to claim 7, wherein the light guide includes a total reflection surface for totally reflecting a part of light from the incident surface.

11. The illumination device according to claim 8, wherein a light flux which is not total reflected but reflected by the total reflection surface among the light fluxes from the incident surface exits from the exit surface.

12. The illumination device according to claim 1, wherein the spectroscopic unit includes an anti-reflection film for preventing reflection of visible light, on a surface of the substrate opposite to the surface facing the light source.

13. The illumination device according to claim 1, wherein the spectroscopic unit includes an ultraviolet reflection film for reflecting ultraviolet light, on a surface of the substrate opposite to the surface facing the light source.

14. The illumination device according to claim 1, wherein a surface of the substrate opposite to the surface facing the light source is separated from the light guide.

15. The illumination device according to claim 1, wherein a surface of the substrate opposite to the surface facing the light source is in close contact with or adheres to the light guide.

16. The illumination device according to claim 1, wherein the spectroscopic unit includes a gloss surface different from the surface facing the light source.

17. An image reading apparatus comprising:
    an illumination device comprising:
       a light source;
       a light guide including an incident surface on which light from the light source is incident; and
       a spectroscopic unit disposed between the light source and the incident surface,
       wherein the spectroscopic unit includes:
          a substrate made of glass; and
          a multi-layer film that is provided on a surface of the substrate facing the light source and reflects infrared light toward the light source;
    an imaging optical system that forms an image of a document; and
    an image pickup element that photoelectrically converts the image formed by the imaging optical system.

* * * * *